(12) United States Patent
Noordhuis et al.

(10) Patent No.: US 9,687,109 B2
(45) Date of Patent: Jun. 27, 2017

(54) DEVICE FOR FROTHING A LIQUID

(71) Applicant: KONINKLIJKE PHILIPS N.V., Eindhoven (NL)

(72) Inventors: Joeke Noordhuis, Eindhoven (NL); Jarno Beekman, Eindhoven (NL); Hendrikus Lodewijk Joseph Franciscus Holten, Eindhoven (NL); Judith Margreet Hanneke Ogink, Eindhoven (NL); Fransiscus Hermannus Feijen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/763,991

(22) PCT Filed: Jul. 7, 2014

(86) PCT No.: PCT/EP2014/064489
§ 371 (c)(1),
(2) Date: Jul. 28, 2015

(87) PCT Pub. No.: WO2015/004076
PCT Pub. Date: Jan. 15, 2015

(65) Prior Publication Data
US 2016/0113436 A1 Apr. 28, 2016

(30) Foreign Application Priority Data
Jul. 10, 2013 (EP) .................................... 13175946

(51) Int. Cl.
*A47J 31/44* (2006.01)
(52) U.S. Cl.
CPC ....... *A47J 31/4489* (2013.01); *A47J 31/4485* (2013.01)

(58) Field of Classification Search
CPC .................................................. A47J 31/4485
(Continued)

(56) References Cited

U.S. PATENT DOCUMENTS

| 5,855,162 A | * | 1/1999 | Bauer | ..................... A47J 31/46 222/566 |
| 8,708,856 B2 | * | 4/2014 | Shin | ....................... F16H 29/04 475/16 |

(Continued)

FOREIGN PATENT DOCUMENTS

| EP | 0803220 A1 | 10/1997 |
| EP | 1707090 A1 | 10/2006 |

(Continued)

*Primary Examiner* — Thien S Tran

(57) ABSTRACT

A device (2, 3, 4, 5, 6, 7, 8) for frothing a liquid (15) is presented, in particular for providing two or more streams of froth in parallel. The device comprises: a steam generator (10) for generating a stream of steam (13), a steam splitter (30) for splitting the stream of steam (13) into a first sub-stream of steam (33A) and a second sub-stream of steam (33B), wherein the first sub-stream of steam (33A) is provided at a first steam outlet (32A) and the second sub-stream of steam (33B) is provided at a second steam outlet (32B), a first frothing unit (11A) having a first liquid inlet (14A) and a first steam inlet (16A), a second frothing unit (11B) having a second liquid inlet (14B) and a second steam inlet (16B), wherein the first steam outlet (32A) of the steam splitter (30) is connected to the first steam inlet (16A) of the first frothing unit (11A) and the second steam outlet (32B) of the steam splitter (30) is connected to the second steam inlet (16B) of the second frothing unit (11B). In a further aspect a coffee machine (50) comprising a coffee brewing unit (51) and the device for frothing a liquid is presented.

12 Claims, 13 Drawing Sheets

(58) Field of Classification Search
USPC .................. 99/279, 287, 209, 293, 323.1
See application file for complete search history.

(56) References Cited

U.S. PATENT DOCUMENTS

2005/0223911 A1    10/2005  Landolt
2007/0012193 A1*   1/2007   Oehninger .............. A47J 31/46
                                                          99/279
2011/0072977 A1    3/2011   Mahlich

FOREIGN PATENT DOCUMENTS

| JP | 1057249 A | 3/1998 |
| TW | M436404 U | 9/2012 |
| WO | 0221983 A1 | 3/2002 |
| WO | 2007036856 A2 | 4/2007 |
| WO | 2011158171 A1 | 12/2011 |

* cited by examiner

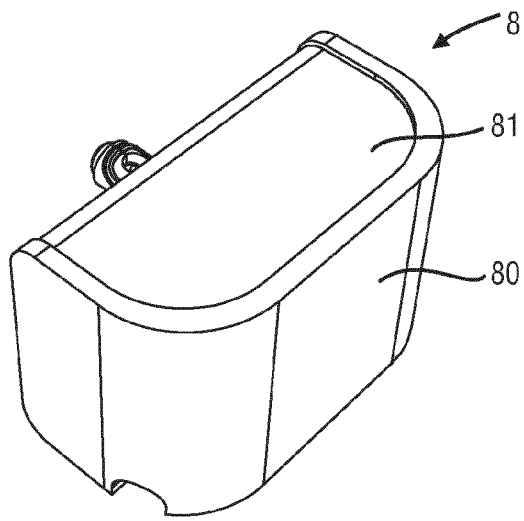 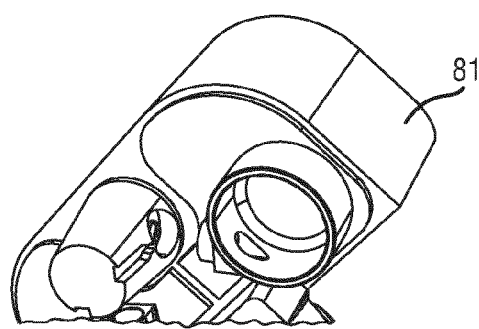
FIG. 9A  FIG. 9B
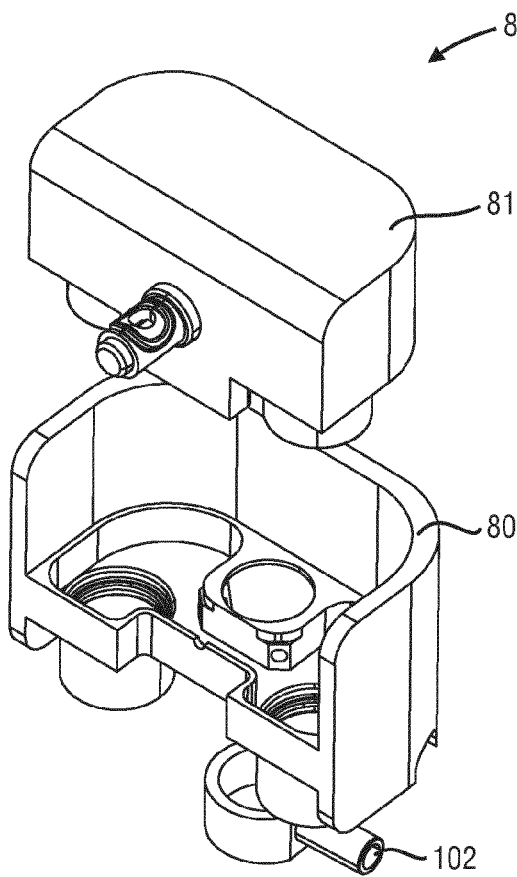 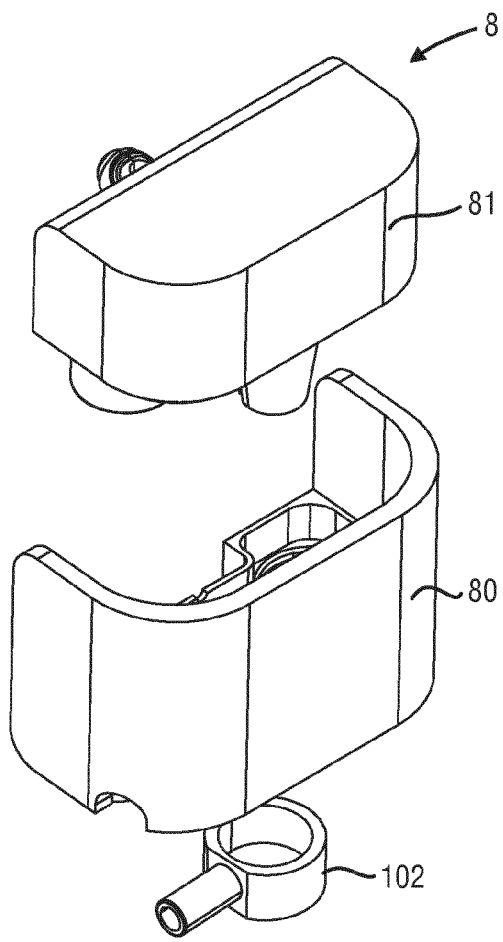
FIG. 9C  FIG. 9D

DEVICE FOR FROTHING A LIQUID

This application is the U.S. National Phase application under 35 U.S.C. §371 of International Application No. PCT/EP2014/064489, filed on Jul. 7, 2014, which claims the benefit of European Application No. 13175946.6 filed on Jul. 10, 2013. These applications are hereby incorporated by reference herein.

FIELD OF THE INVENTION

The present invention relates to a device for frothing a liquid, in particular for providing two or more streams of froth in parallel. Furthermore, the present invention relates to a coffee machine including the device for frothing a liquid.

BACKGROUND OF THE INVENTION

Many automated coffee machines in the cup-by-cup segment have the ability to prepare two cups of coffee simultaneously. Some automated coffee machines are able to produce milk froth as well in order to serve milk-based coffee drinks.

Frothing a liquid involves applying a gas like air to the liquid and mixing the liquid with the gas for obtaining bubbles in the liquid. The result is referred to as foam or froth. In many cases, the liquid to be frothed is milk. Especially in the field of making coffee and coffee specialties, there is a need for a device which is capable of frothing milk in a user-friendly manner. It is a well-known option to combine a frothing process of milk with a heating process of milk, wherein air is supplied to the milk for obtaining froth, and wherein steam is supplied to the milk for increasing the temperature of the milk.

US 2011/0072977 A1 discloses a coffee/espresso machine comprising a milk foam generating device for cappuccino. By splitting the milk foam or froth into two streams, two milk-based coffee drinks can be prepared in parallel.

In conventional devices, two streams of milk froth are obtained with one milk frothing chamber having two outlets. When a stream of milk froth is to be split there are basically two options: a pressurized piping split or an atmospheric gutter split. However, there are problems involved with these approaches.

Regarding the piping split, when a pipe (usually a silicon hose) is split into two separate pipes, the actual frothing unit can be located at a relative large distance, while the two outlets can be brought very close to the coffee outlets. An advantage of a piping split is that it enables a compact design. A disadvantage of a piping split is that cleaning of the piping split is difficult. Milk residue can lead to bacterial growth. Furthermore, milk residue can build up, (partially) clog the device and impair the quality of the milk froth.

Alternatively, an atmospheric gutter split can be used. A gutter split is known, for example from manual espresso machines, where a gutter is used for making the split of espresso. In an atmospheric gutter split, the froth to be split drops onto the gutter by gravity and is diverted to the froth outlets of the gutter by gravity as well. Thus, in addition to the height for the device for frothing the liquid, extra height is required for the atmospheric gutter split in a vertical direction between a frothing chamber of device for frothing the liquid and cups for receiving the frothed liquid. An advantage of a gutter split is that the cleaning is much easier. A disadvantage of a gutter split is that it does not allow for a compact design. As a further disadvantage the splitting accuracy is limited and is at least influenced by an accidental non-horizontal placement of the appliance. It is thus difficult to provide two streams that provide equal amounts of froth.

WO 02/21983 A1 discloses a discharge assembly for a beverage machine for preparing various beverages on the basis of coffee and/or milk, in which coffee, milk and vapor are guided to a respective discharge element via separate supply lines. Said discharge elements are disposed on support arms that form an integral part of a retainer with a central control disk and that project radially outwards. The free face of said control disk rests against the face of a stationary inlet disk, and the control disk and the inlet disk can be glidingly displaced relative to each other about their common disk axis. The control disk and the inlet disk are interspersed by channels that have two openings, the first openings being disposed on the opposite faces of the control disk and the inlet disk, and the second openings lying outside said faces. The second opening of each channel in the control disk communicates with at least one discharge element each via a tubular line and the second opening of each channel in the inlet disk communicates with one of the supply lines for coffee, milk and vapor each. The openings on the faces of the control disk and the inlet disk are disposed in such a manner that for every support arm in its discharge position the channels in the inlet disk are linked with the corresponding channels in the control disk which communicate with the discharge elements of the support arm in its discharge position.

SUMMARY OF THE INVENTION

It is an object of the present invention to provide an improved device for frothing a liquid that provides a compact system design and offers improved cleanability. It is a further object of the present invention to provide an improved device for frothing a liquid that provides streams of froth providing equal amounts of froth.

In a first aspect of the present invention, a device for frothing a liquid is presented that comprises
a steam generator for generating a stream of steam,
a steam splitter for splitting the stream of steam into a first sub-stream of steam and a second sub-stream of steam, wherein the first sub-stream of steam is provided at a first steam outlet and the second sub-stream of steam is provided at the second steam outlet,
a first frothing unit having (i) a first mixing unit, which is connected to a first liquid inlet and a first steam inlet for providing a combination of liquid and steam, and (ii) a first frothing chamber for receiving and frothing the combination of liquid and steam,
a second frothing unit having (i) a second mixing unit, which is connected to a second liquid inlet and a second steam inlet for providing a combination of liquid and steam, and (ii) a second frothing chamber for receiving and frothing the combination of liquid and steam,
wherein the first steam outlet of the steam splitter is connected to the first steam inlet of the first frothing unit and the second steam outlet of the steam splitter is connected to the second steam inlet of the second frothing unit,
wherein the first frothing unit and the second frothing unit comprise a common first body and/or a common second body, wherein the common first body comprises a first part of the first mixing unit, a first part of the second mixing unit, a first part of the first frothing chamber and a first part of the second frothing chamber, and wherein the common second body comprises: (i) a second part of the first mixing unit and/or a second part of the first frothing chamber, and (ii) a second part of the second mixing unit and/or a second part of the second frothing chamber.

In a further aspect of the present invention, a coffee machine is presented that comprises a coffee brewing unit for providing a stream of coffee and the aforementioned device for frothing a liquid.

Preferred embodiments of the invention are defined in the dependent claims. It shall be understood that the claimed coffee machine can have similar and/or identical preferred embodiments as the claimed device for frothing a liquid and as defined in the dependent claims.

Solutions according to the prior art comprise a single frothing unit that is followed by a froth splitter. The two approaches for a froth splitter are piping split and gutter split. The piping split enables a compact design but is difficult to clean. A gutter split provides improved cleanability but is not compact. Compactness is particularly desired in a vertical direction such that the output part, for example of a coffee machine where coffee and milk froth are provided, is nice and compact. For example, a tall glass for latte macchiato should still fit underneath the device for frothing a liquid of a coffee machine.

The inventors have found that for a compact and easy-to-clean device for frothing a liquid it is advantageous to shift the split from the froth outlet to the steam inlet and to provide two separate frothing units for providing two separate streams of froth.

Thus, according to the present invention, the split is made in the steam system instead of splitting the froth. A single steam generator is provided for generating a stream of steam. The steam generator is connected to a steam splitter for splitting the stream of steam into a first and second sub-stream of steam. These sub-streams of steam are provided to two separate frothing units. Each frothing unit further comprises a liquid inlet for receiving the liquid to be frothed. A frothing gas mixes with the liquid for the purpose of obtaining bubbles in the liquid, which is referred to as foam or froth. Ambient air is typically used as the frothing-gas in the field of milk-based coffee drinks. Optionally, different liquids can be provided to the respective frothing units. For example, full cream milk can be provided to the first frothing unit, whereas skim milk, soy milk or lactose-free milk is provided to the second frothing unit.

Compared to an atmospheric gutter split, the use of two separate frothing units enables a compact design in the vertical direction. Each frothing unit comprises a froth outlet for providing a separate sub-stream of froth. The sub-streams can be directly provided to separate cups in parallel. Thus, no additional elements are required in the vertical direction between frothing units and cups for receiving the frothed liquid. It should be noted that compactness in a horizontal direction is not crucial.

The use of a single steam generator followed by the steam splitter enables a compact design. The steam generator can also be referred to or be part of a 'thermoblock'. The steam splitter can be implemented, for example, as a T-piece or Y-split in a steam supply pipe or hose. The steam splitter is effectively cleaned and/or sterilized by the steam passing through and does not require separate cleaning. In contrast to a froth splitter, the steam splitter is not in contact with the liquid to be frothed. Hence, no direct access to the steam splitter is required for cleaning. The steam splitter offers further design flexibility since the steam splitter can be located at a distance with respect to the actual frothing units. In general, splitting steam is rather simple compared to splitting froth. In a further example, there are more than two frothing units and also the steam splitter is adapted accordingly.

In a preferred embodiment, the device for frothing a liquid further comprises a liquid splitter for splitting a liquid into a first sub-stream of liquid and a second sub-stream of liquid, wherein the first sub-stream of liquid is provided at a first liquid outlet and the second sub-stream of liquid is provided at a second liquid outlet, wherein the first liquid outlet of the liquid splitter is connected to the first liquid inlet of the first frothing unit and the second liquid outlet of the liquid splitter is connected to the second liquid inlet of the second frothing unit. This embodiment has the advantage that a single liquid source can be used. The liquid source can be a container that is connected to the liquid inlet via a hose or pipe. For example for a coffee machine, the container can be an internal tank of the coffee machine or an external container such as a milk container. A further advantage of splitting a liquid instead of froth is improved cleanability. One problem of a froth splitter is that residues of hot froth remain within the froth splitter, dry out and stick thereto. The liquid, however, typically has a much lower temperature than the froth. Therefore, residues of liquid within the liquid splitter do not dry out quickly and can simply be rinsed off with water.

In another embodiment, the device for frothing a liquid further comprises a steam-splitter control for manipulating the splitting of the stream of steam into the first sub-stream of steam and the second sub-stream of steam. In particular, a splitting ratio can be manipulated. The splitting ratio determines the portion of the stream of steam that is provided as the first sub-stream of steam and the second sub-stream of steam. For example, the splitting ratio can be 50%/50%, i.e. 50% of the stream of steam is directed to the first sub-stream of steam and 50% of the stream of steam is directed to the second sub-stream of steam. The steam-splitter control can manipulate this ratio, for example directing 30% of the steam into the first sub-stream of steam and thus to the first frothing unit, and 70% of the steam into the second sub-stream of steam thus to the second frothing unit. In consequence, the two frothing units can be operated in parallel to produce different types and/or different amounts of froth. For example, a cappuccino and a latte macchiato can be provided at the same time.

In a further aspect of this embodiment, the steam-splitter control manipulates a cross-section of the first and/or the second steam outlet of the steam splitter. For example, a mechanical shutter determines a size of the cross-section of the first and/or second stream outlet by partially blocking the respective outlet. Alternatively, an electro-mechanical shutter can be used. However, the invention is not limited in this respect.

In another embodiment the device for frothing a liquid further comprises a liquid-splitter control for manipulating the splitting of the liquid into a first sub-stream of liquid and a second sub-stream of liquid. The first sub-stream of liquid is provided to the first liquid inlet of the first frothing unit. The second sub-stream of liquid is provided to the second liquid inlet of the second frothing unit. The liquid-splitter control can provide similar effects as the aforementioned steam-splitter control.

In a preferred embodiment, the first frothing unit comprises a first mixing unit, and a first frothing chamber, wherein the first mixing unit is connected to the first liquid inlet and the first steam inlet, and wherein the first mixing unit comprises a first mixing-unit outlet for providing a combination of liquid and steam, and wherein the first frothing chamber comprises a first frothing-chamber inlet for receiving the combination of liquid and steam from the first mixing unit. The first mixing unit can also be referred to as a first liquid/steam feed. The first mixing unit thus serves for combining liquid and steam. The first mixing unit can be further configured as a Venturi tube, wherein steam passing a constriction causes a vacuum during operation of the device, which in turn causes suction of the liquid into the mixing unit. Furthermore, the steam supplied to the liquid increases the temperature of the liquid. The combination of a liquid and steam is supplied to the frothing chamber, where the actual frothing process takes place. Of course, the second frothing unit can be configured accordingly. The first and the second frothing unit can each comprise a mixing unit and a frothing chamber. Alternatively, only the second frothing unit comprises a mixing unit and a frothing chamber.

In general, the device for frothing a liquid comprises a frothing gas inlet. In an embodiment, the first frothing unit further comprises a first frothing-gas inlet. Alternatively, the frothing gas can also be provided along with the steam or the liquid.

In a further embodiment of the frothing unit comprising a first mixing unit and a first frothing chamber, the first mixing-unit outlet is separated from the first frothing-chamber inlet by a free space, wherein said free space constitutes the frothing-gas inlet. The advantage of using a free space between mixing unit and frothing chamber as the frothing-gas inlet is that a relatively large frothing-gas inlet can be used. A large frothing-gas inlet simplifies cleaning and prevents clogging of the frothing-gas inlet.

Optionally, a diameter of the first mixing-unit outlet is smaller than the first frothing-chamber inlet. The frothing-chamber inlet can be configured as a cone-shape for receiving the combination of liquid and steam as well as the frothing gas.

The combination of liquid and steam can be thought of as a liquid/steam jet from the mixing unit to the frothing chamber. Under the influence of this liquid/steam jet, the frothing gas that is presented in the free space is made to flow as well along with the jet and enters the first frothing chamber. Consequently, a frothing process takes place in the frothing chamber, wherein the entrained frothing gas interacts with the liquid and steam.

In a further embodiment, the first frothing unit comprises a first body and a second body, wherein the first body of the first frothing unit comprises a first part of the first mixing unit and a first part of the first frothing chamber, and wherein the second body of the first frothing unit comprises a second part of the first mixing unit and/or a second part of the first frothing chamber. Advantageously, the frothing unit is not made as a single element, but comprises two body parts. Advantageously, these two body parts are separable for easy cleaning. In particular, at least one of the parts comprises a portion of the mixing unit and also a portion of the frothing chamber. Thereby, the number of parts can be reduced. This is advantageous for cleaning as the user has to disassemble fewer parts. A problem of frothing units according to the prior art is that some users do not disassemble all the required parts for cleaning, such that not all areas are cleaned properly. For example if milk residue accumulates, a proper functioning of the device is no longer possible. Furthermore, accumulation of milk residue can lead to bacterial growth. The frothing unit according to this embodiment comprises a first body and a second body that have to be disassembled by the user.

According to a further refinement, the first body of the first frothing unit and the second body of the first frothing unit are configured for separation in a direction transverse to an axis extending through the first mixing-unit outlet and the first frothing-chamber inlet.

A portion of the device that is typically difficult to clean is the region between the first mixing unit and the first frothing chamber. The separation in a direction transverse to the axis extending through the first mixing-unit outlet and the first frothing-chamber inlet provides better access to areas that are difficult to clean.

This refinement is particularly advantageous for the case when the second body of the first frothing unit comprises both a second part of the first mixing unit and a second part of the first frothing chamber. Thus, mixing unit and frothing chamber can be separated together. In consequence, there can be one part less to disassemble for the user in the cleaning process.

Advantageously, the first body of the first frothing unit and the second body of the first frothing unit are configured for separation such that a separation of the two body parts provides access to the free space or frothing-gas inlet.

In a further refinement, the first body of the first frothing unit comprises a first conical contact surface, and the second body of the first frothing unit comprises a second corresponding contact surface.

In a further refinement, the device for frothing a liquid further comprises alignment means for aligning the first body of the first frothing unit and the second body of the first frothing unit with respect to each other. In an embodiment, the conical contact surfaces are sufficient for alignment however, additional alignment means can be provided. The alignment means guide the body parts with respect to another for easy reassembly after cleaning.

In a further embodiment, at least one of the first body of the first frothing unit and the second body of the first frothing unit comprise at least one of rubber and 2K mold. The use of rubber, a two-component mold (2K mold), i.e. a mold material comprising a softer and a harder component, or similar materials is advantageous, since the rubber or soft material can be used for providing a seal between the first body of the first frothing unit and the second body of the first frothing unit. In other words, additional seals such as O-rings can be omitted and the part count can be further reduced.

The second frothing unit comprises a first body and a second body, wherein the first body of the second frothing unit comprises a first part of a second mixing unit and a first part of a second frothing chamber, and wherein the second body of the second frothing unit comprises a second part of the second mixing unit and/or a second part of the second frothing chamber, and wherein the first frothing unit and the second frothing unit comprise a common first body and/or a common second body, the common first body comprising the first body of the first frothing unit and the first body of the second frothing unit, the common second body comprising the second body of the first frothing unit and the second body of the second frothing unit. The advantage of this embodiment is easy disassembly and easy cleaning also for multiple frothing units. In the most basic configuration, there are only two body parts, the common first body and the common second body. By separating these two body parts access is provided to all mixing units and all frothing chambers for cleaning purposes. It should be noted that from a user perspective, a 'body' is a part that is not separable, even though a body can be manufactured from a plurality of parts, for example if hollow spaces such as a steam pipe need to be provided.

In another embodiment, the device for frothing a liquid further comprises a rotatable liquid connector for receiving the liquid from different directions, wherein the rotatable liquid connector is connected to the liquid splitter. A container comprising the liquid can be connected to the liquid connector, for example, via a hose or pipe. The advantage of this embodiment is that liquid can be provided from the different directions, for example a milk container can be placed at either side of the device for frothing a liquid.

BRIEF DESCRIPTION OF THE DRAWINGS

These and other aspects of the invention will be apparent from and elucidated with reference to the embodiments described hereinafter. In the following drawings:

FIGS. 9A to 9F show a further embodiment of a device for frothing a liquid.

DETAILED DESCRIPTION OF THE EMBODIMENTS

The present invention relates to the field of frothing liquids, and possibly also heating liquids in the process. A popular option is the use of steam in the process. Firstly, the steam has a function in heating the liquid to be frothed to a desired temperature. Secondly, the steam can be used for driving a transport process of the liquid, while at the same time taking care that a frothing gas such as air can be sucked in. Thirdly, steam can even induce refinement of the foam that is obtained in the liquid as a result of the frothing process. The versatility of steam-operated devices in combination with a relatively low number of components which are contaminated with the liquid explains the wide-spread use of such devices.

Figure 1:
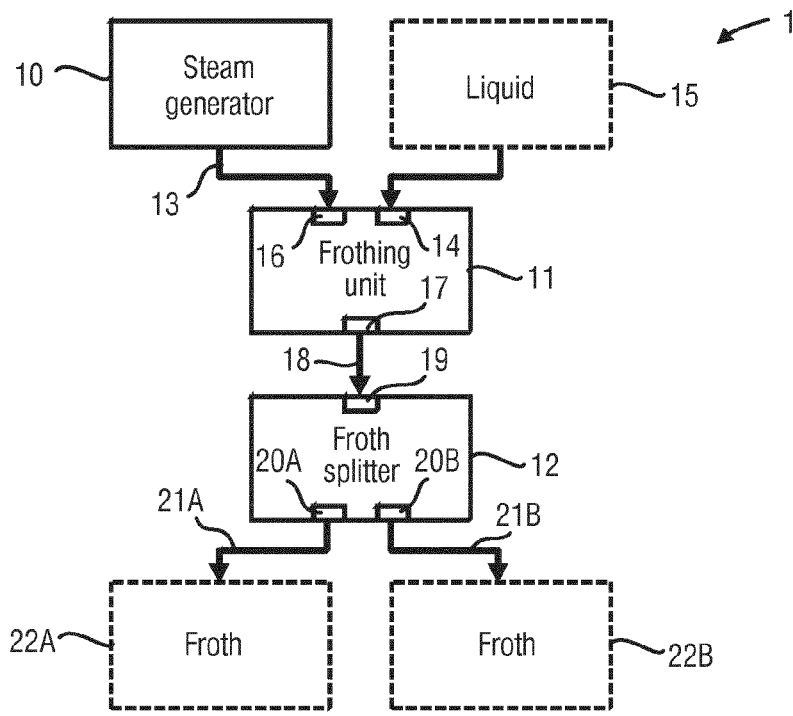
FIG. 1 shows a block diagram of a conventional device for frothing a liquid.

FIG. 1 shows an embodiment of a conventional device 1 for frothing a liquid 15. The device 1 comprises a steam generator 10, a frothing unit 11 and a froth splitter 12. The steam generator 10 generates a stream of steam 13. The frothing unit 11 comprises a liquid inlet 14 for receiving a liquid 15, and a steam inlet 16 that is directly connected to the steam generator 10 for receiving the stream of steam 13. The frothing unit 11 further comprises a froth outlet 17 for providing a stream of froth 18. The froth splitter 12 comprises a froth inlet 19, a first froth outlet 20A and a second froth outlet 20B. The froth outlet 17 of the frothing unit 11 is connected to the froth inlet 19 of the froth splitter 12 such that the froth splitter 12 is configured for receiving the stream of froth 18. The froth splitter 12 is configured for splitting the stream of froth 18 into a first sub-stream of froth 21A, provided at the first froth outlet 20A, and a second sub-stream of froth 21B, provided at the second froth outlet 20B. Thus, as a result, two streams of froth 21A, 21B are provided. Froth 22A, 22B can be used, for example, for topping a beverage.

The process of frothing a liquid is known in the art and will therefore not be discussed in detail. In the following, it is at least in some examples assumed that the liquid to be frothed is milk, and that the gas that is used in the process of frothing the liquid is air. For sake of completeness, it should be noted that the present invention is not limited to milk and air. A typical application scenario of the present invention is providing streams of milk froth in a cup-by-cup coffee machine for two cups in parallel.

Figure 2A:
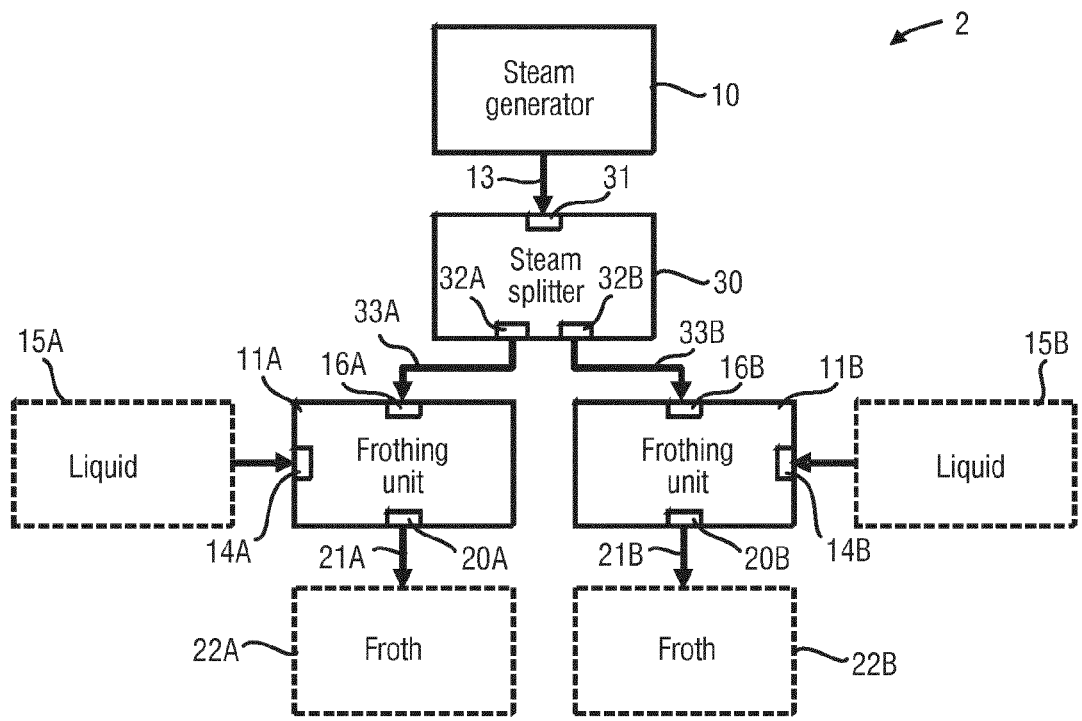
FIG. 2A shows a first embodiment of a device for frothing a liquid according to an aspect of the present invention.

FIG. 2A shows a first embodiment of a device 2 for frothing a liquid 15A, 15B according to an aspect of the present invention. The device 2 comprises a steam generator 10, a steam splitter 30 as well as a first frothing unit 11A and a second frothing unit 11B. The steam generator 10 generates a stream of steam 13. The steam splitter 30 comprises a steam-splitter inlet 31, a first steam outlet 32A and a second steam outlet 32B. The steam splitter 30 receives the stream of steam 13 at the steam-splitter inlet 31 and splits the stream of steam 13 into a first sub-stream of steam 33A and a second sub-stream of steam 33B. The first sub-stream of steam 33A is provided at the first steam outlet 32A and the second sub-stream of steam 33B is provided at the second steam outlet 32B.

The first frothing unit 11A comprises a first liquid inlet 14A for receiving the liquid 15A, a first steam inlet 16A for receiving the first sub-stream of steam 33A, and a first froth outlet 20A for providing a first stream of froth 21A. The second frothing unit 11B comprises the corresponding second liquid inlet 14B, second steam inlet 16B and second froth outlet 20B.

The device 2 for frothing a liquid shown in FIG. 2A differs from the prior art device shown in FIG. 1 in that an alternative solution for using a froth splitter 12 is provided. Instead of a froth splitter 12, the device 2 according to the embodiment shown in FIG. 2A comprises a steam splitter 30 and a second frothing unit 11B.

Compared to a conventional system using a piping split as froth splitter 12, the system according to the present invention provides an improved cleanability. Compared to a conventional system using a gutter split as a froth splitter 12, the device 2 according to the present invention enables a more compact design. Thus, the device 2 for frothing a liquid according to the present invention enables both improved cleanability and compact design in one device. It should be noted that the steam splitter 30 can be implemented in a very compact manner. Since the steam system is basically self-cleaning and self-sterilizing, it is not required to provide access to the steam splitter 30 for cleaning. Instead of using one large frothing unit 11, the first frothing unit 11A and the second frothing unit 11B can be designed for reduced capacity, such that an overall compact design can be achieved even though a second frothing unit 11B is employed.

Figure 2B:
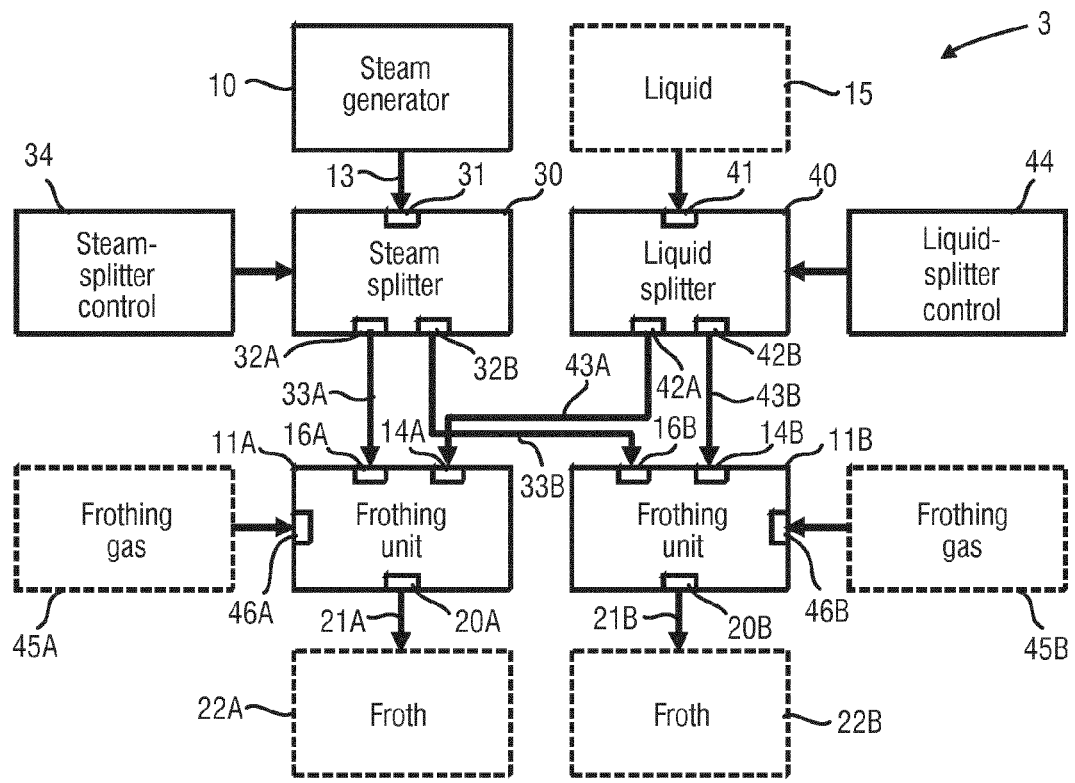
FIG. 2B shows a second embodiment of a device for frothing a liquid according to an aspect of the present invention.

FIG. 2B shows a second embodiment of a device 3 for frothing a liquid 15 according to an aspect of the present invention. Differences with respect to the embodiment shown in FIG. 2A are highlighted instead of repeating corresponding features. The embodiment shown in FIG. 2B further comprises a steam-splitter control 34, a liquid splitter 40 and a liquid-splitter control 44.

The liquid splitter 40 comprises a liquid-splitter inlet 41, a first liquid outlet 42A and a second liquid outlet 42B. The liquid splitter 40 receives the liquid 15 at the liquid-splitter inlet 41 and splits the liquid 15 into a first sub-stream of liquid 43A and a second sub-stream of liquid 43B. The first sub-stream of liquid 43A is provided at the first liquid outlet 42A and the second sub-stream of liquid 43B is provided at the second liquid outlet 42B. The first liquid outlet 42A of the liquid splitter 40 is connected to the liquid inlet 14A of the first frothing unit 11A. The second liquid outlet 42B of the liquid splitter 40 is connected to the liquid inlet 14B of the second frothing unit 11B.

The steam-splitter control 34 is adapted for manipulating the splitting of the stream of steam 13 into the first sub-stream of steam 33A and the second sub-stream of steam 33B. For example, the steam-splitter control 34 manipulates a cross-section of the first steam outlet 32A and/or the second steam outlet 32B of the steam splitter 30. However, any suitable means for manipulating a splitting ratio or flow rate of sub-streams of steam 33A, 33B can be used.

Correspondingly, the liquid-splitter control 44 is configured for manipulating the splitting of the liquid 15 into the first sub-stream of liquid 43A and the second sub-stream of liquid 43B. This can also be effected, for example, by manipulating a cross-section of the first liquid outlet 42A and/or the second liquid outlet 42B.

The process of frothing a liquid involves the use of a frothing gas 45A, 45B. The frothing gas 45A, 45B can be added at different stages of the process. Firstly, the frothing gas can be provided by the steam generator 10 along with the stream of steam 13. Thus, the stream of steam 13 can comprise the frothing gas. Alternatively, the frothing gas 45A, 45B can be added at the steam splitter 30 or the liquid splitter 40 and thus be contained in the respective sub-streams of steam 33A, 33B and/or the respective sub-streams of liquid 43A, 43B. In the embodiment shown in FIG. 2B, the frothing gas 45A, 45B is added directly at each frothing unit 11A, 11B. The frothing units 11A, 11B in this embodiment each further comprise a frothing gas inlet 46A, 46B. Same or different frothing gases 45A, 45B can be employed. However, the frothing gas typically is ambient air.

The device 3 for frothing a liquid 15 eventually provides a first sub-stream of froth 21A at the first froth outlet 20A of the first frothing unit 11A, and a second sub-stream of froth 21B at the second froth outlet 20B of the second frothing unit 11B and thereby provides froth 22A and froth 22B.

Figure 3:
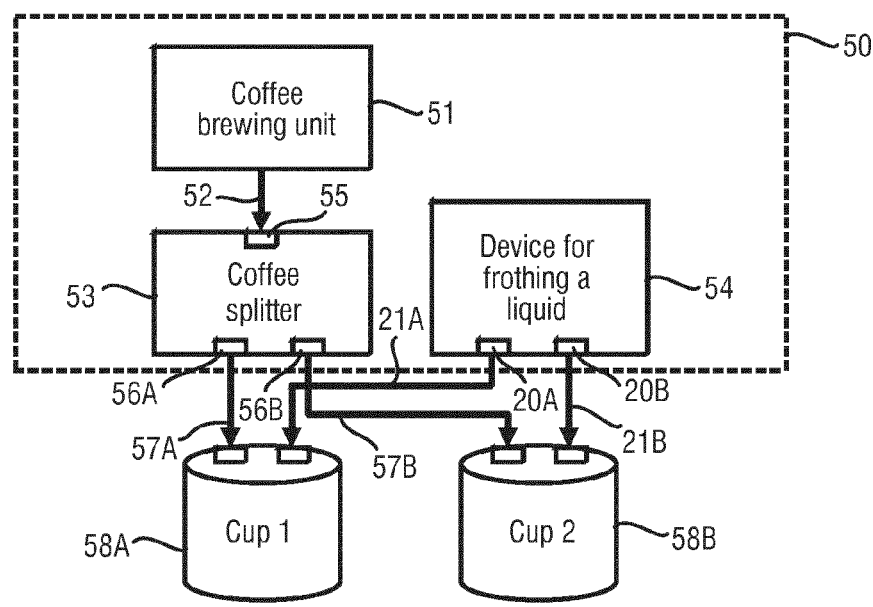
FIG. 3 shows an embodiment of a coffee machine comprising a device for frothing a liquid.

FIG. 3 shows an embodiment of a coffee machine 50 according to a further aspect of the present invention. The coffee machine comprises a coffee brewing unit 51 for providing a stream of coffee 52, a coffee splitter 53 and a device for frothing a liquid 54 as, for example, described with reference to FIG. 2A or 2B.

The coffee splitter 53 comprises a coffee inlet 55, a first coffee outlet 56A and a second coffee outlet 56B. The coffee splitter 53 is configured for splitting the stream of coffee 52 into a first sub-stream of coffee 57A and a second sub-stream of coffee 57B. The first sub-stream of coffee 57A is provided at the first coffee outlet 56A and the second sub-stream of coffee 57B is provided at the second coffee outlet 56B. The device for frothing a liquid 54 comprises a first froth outlet 20A for providing a first sub-stream of froth 21A and a second froth outlet 20B for providing a second sub-stream of froth 21B.

The first sub-stream of coffee 57A and the first sub-stream of froth 21A are provided to a first cup 58A, whereas the second sub-stream of coffee 57B and the second sub-stream of froth 21B are provided to a second cup 58B. Thereby, two milk-based coffee drinks can be prepared in parallel.

Further details of the device for frothing a liquid according to the present invention and exemplary embodiments are elucidated in the following. A steam generator is known in the art and is therefore omitted for sake of clarity.

One of the main difficulties associated with building a device for frothing a liquid, in particular for frothing milk, is the cleanability of the frothing equipment. No matter what system is used, milk will have to be removed carefully. Especially the small areas where the frothing process takes place are difficult to clean. Improper cleaning can on the one hand side lead to bacterial growth and on the other hand hinder a proper functioning of the device, since residues can block a steam, frothing gas or liquid path. Furthermore, such residues are not very appealing to the user.

Figure 4A:
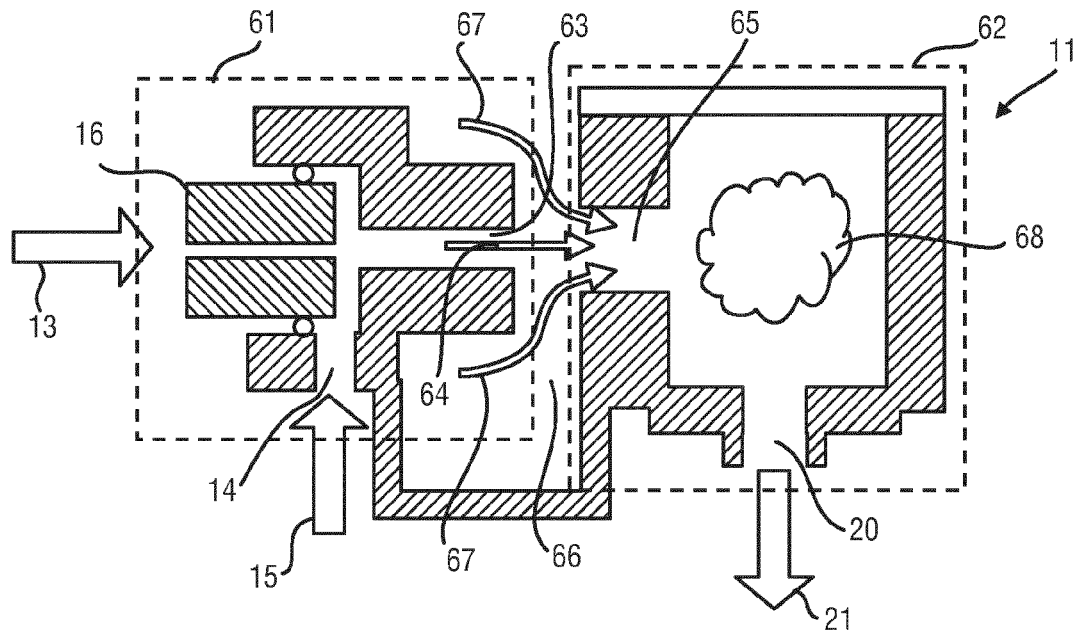
FIG. 4A shows a first embodiment of a frothing unit in an assembled state.
Figure 4B:
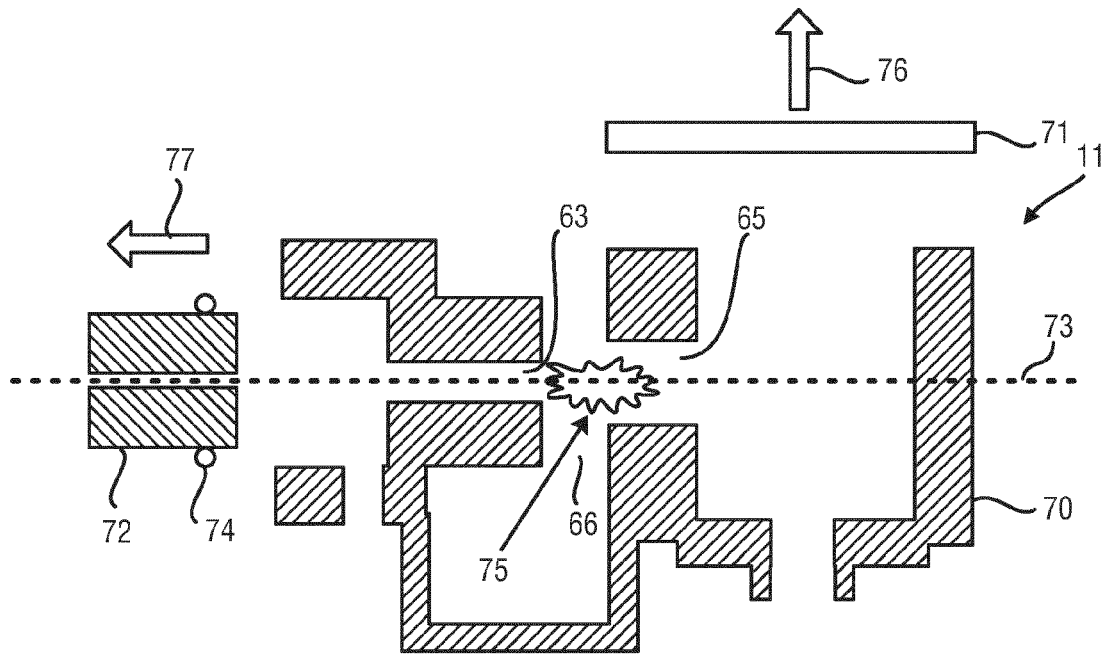
FIG. 4B shows the frothing unit of FIG. 4A in a disassembled state.

FIGS. 4A and 4B show an exemplary embodiment of a frothing unit 11 to illustrate the problem of cleanability. The frothing unit 11 comprises a mixing unit 61 and a frothing chamber 62. The mixing unit 61 is connected to a liquid inlet 14 for receiving a liquid, and to a steam inlet 16 for receiving a stream of steam 13. The mixing unit 61 further comprises a mixing-unit outlet 63 for providing a combination 64 of liquid and steam.

When passing from the steam inlet 16 to the mixing-unit outlet 63, the stream of steam 13 causes a suction force at the liquid inlet 14 for sucking in the liquid. This principle is known from a Venturi tube.

The frothing chamber 62 comprises a frothing-chamber inlet 65 for receiving the combination 64 of liquid and steam from the mixing unit 61. The frothing chamber 62 further comprises a froth outlet 20 for providing a stream of froth 21.

In this embodiment, the mixing-unit outlet 63 is separated from the frothing-chamber inlet 65 by a free space 66 containing a frothing gas 67. When passing from the mixing-unit outlet 63 to the frothing-chamber inlet 65, the combination 64 of liquid and steam also causes a suction force that sucks in the frothing gas 67 contained in the free space 66 between the mixing-unit outlet 63 and the frothing-chamber inlet 65. The frothing process with liquid, steam and frothing gas takes place in the frothing chamber 62 to generate froth 68.

FIG. 4B schematically illustrates the problem of cleanability and disassembling the frothing unit 11 for cleaning. In this embodiment, the frothing unit 11 comprises three parts, i.e. a main frothing-unit body 70, a frothing-chamber lid 71 and a steam connector 72. The frothing-chamber lid 71 can be removed from the main body 70 in a direction 76 transverse to an axis 73 extending through the mixing-unit outlet 63 and the frothing-chamber inlet 65. The steam connector 72 is a separate element that can be removed in a direction 77 along the axis 73. The steam connector 72 comprises an O-ring 74 for providing a seal between the steam connector 72 and the main body 70. In this embodiment, residues 75 can possibly accumulate in the free space 66 between mixing unit outlet 63 and frothing chamber inlet 65. For proper cleaning, both the steam connector 72 as well as the frothing-chamber lid 71 have to be removed. Only then can the device be cleaned properly.

Cleanability is a very important issue for any device for frothing a liquid. Cleanability is even more important for the device for frothing a liquid according to the present invention, because two or more separate frothing units are employed that need to be cleaned.

Figure 5A:
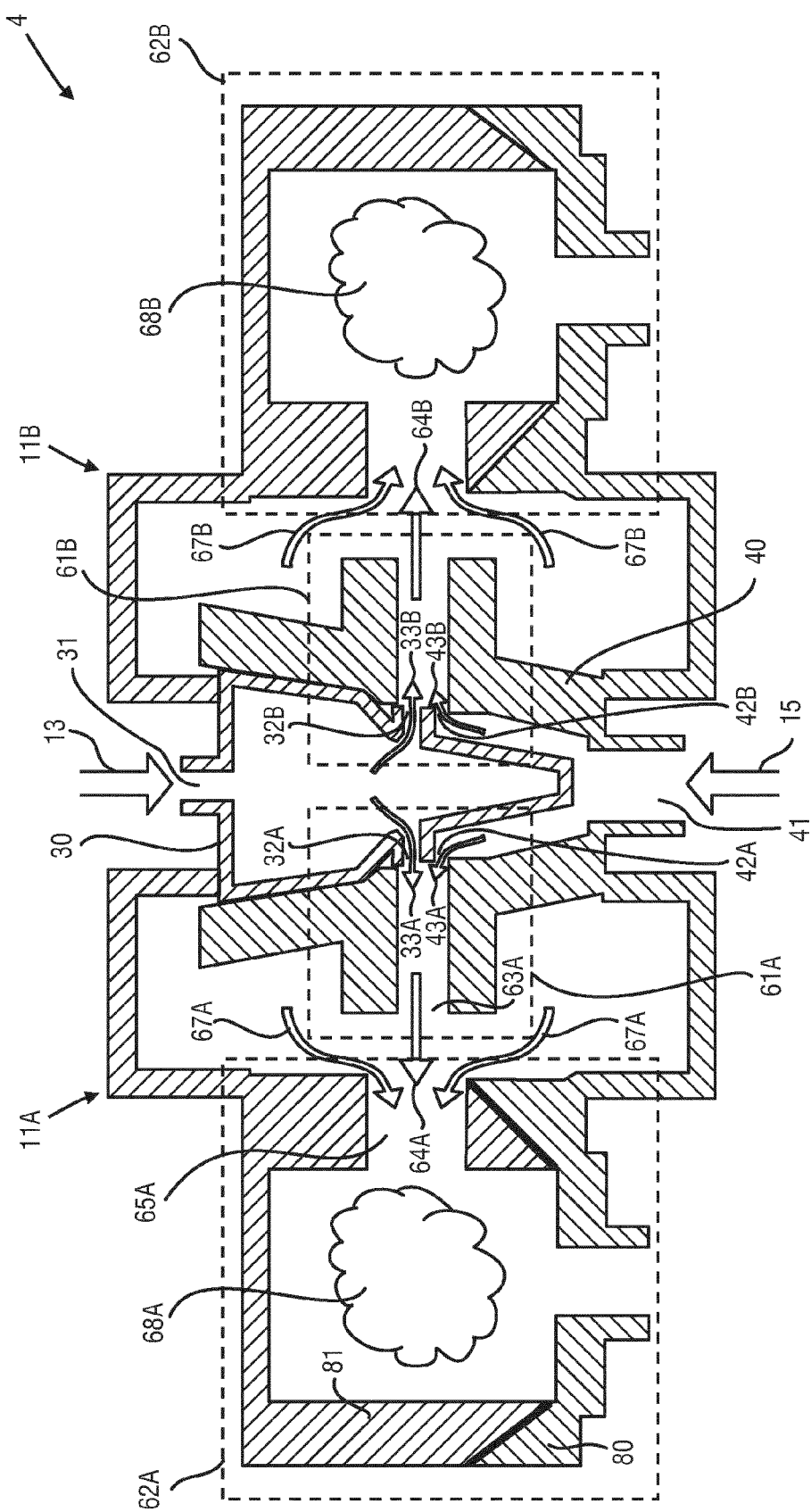
FIG. 5A shows a second embodiment of a frothing unit in an assembled state.
Figure 5B:
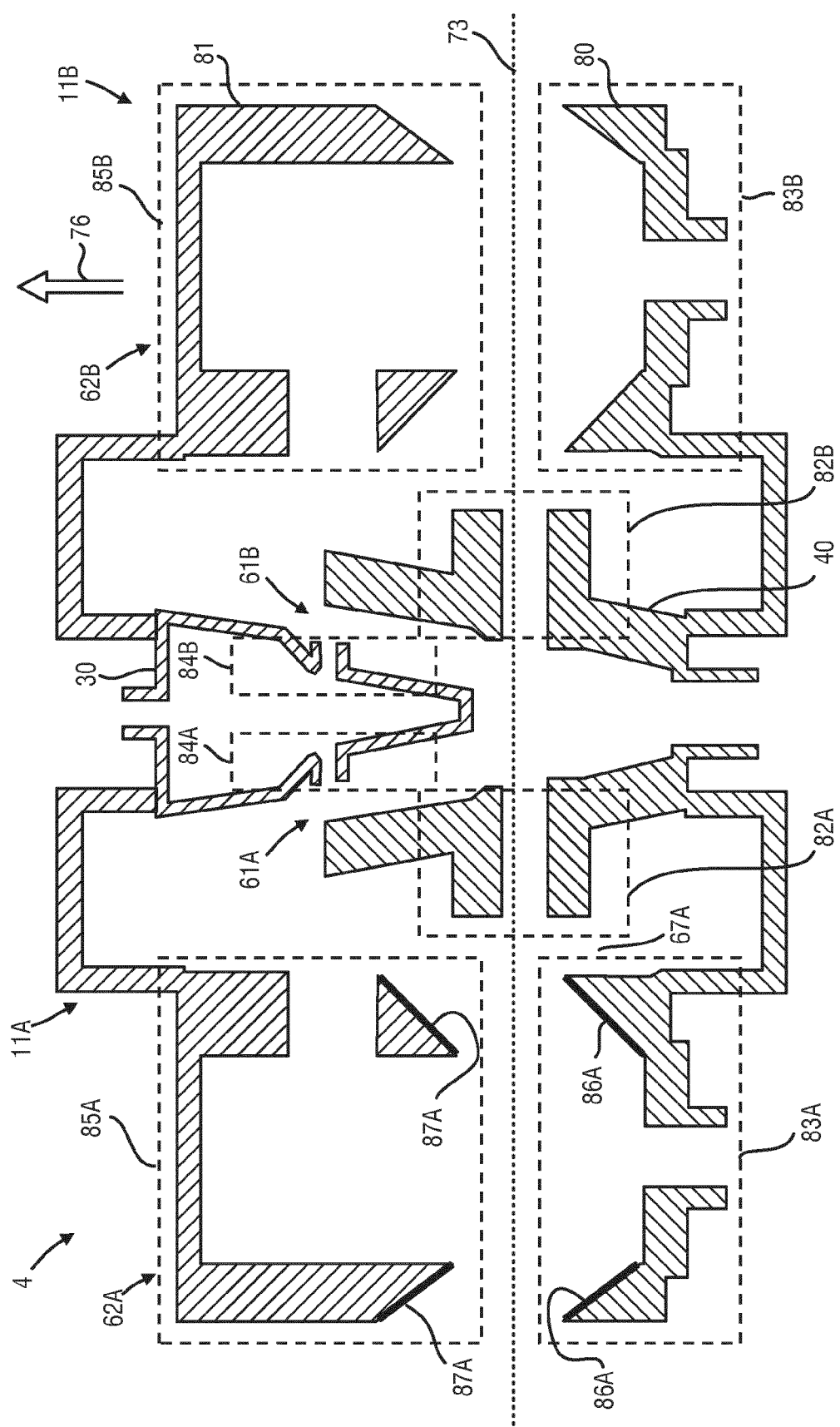
FIG. 5B shows the frothing unit of FIG. 5A in a disassembled state.

FIGS. 5A and 5B show an embodiment of first frothing unit 11A and second frothing unit 11B according to an aspect of the present invention in assembled state in FIG. 5A and disassembled state in FIG. 5B. The steam generator is not shown here.

The device 4 for frothing a liquid shown in FIG. 5A comprises a first frothing unit 11A and a second frothing unit 11B. The first frothing unit 11A comprises a first mixing unit 61A and a first frothing chamber 62A. The second frothing unit 11B comprises a second mixing unit 61B and a second frothing chamber 62B. The steam splitter 30 is the upper central part in FIG. 5A that comprises the steam-splitter inlet 31, the first steam outlet 32A and the second steam outlet 32B. The lower central part constitutes the liquid splitter 40 that comprises the liquid-splitter inlet 41 as well as the first liquid outlet 42A and the second liquid outlet 42B.

The first sub-stream of steam 33A and the first sub-stream of liquid 43A are combined in the first mixing unit 61A. As described with reference to FIG. 4A, the combination 64A of liquid and steam is provided from the first mixing unit 61A to the first frothing chamber 62A as a liquid/steam jet along with frothing gas 67A from the free space between first mixing unit 61A and first frothing chamber 62A. The process for the second frothing unit 11B comprising the second mixing unit 61B and second frothing chamber 62B takes place accordingly.

The device 4 shown in FIGS. 5A and 5B, comprises a first body 80 and a second body 81. The first body 80 and the second body 81 are configured for separation in a direction 76 transverse to an axis 73 extending through the first mixing unit outlet 63A and the first frothing-chamber inlet 65A. The definition of the axis refers to the assembled state shown in FIG. 5A.

In this embodiment, the first body 80 is a common first body 80 comprising the first body of the first frothing unit 11A and the first body of the second frothing unit 11B. The second body 81 is a common second body 81 comprising the second body of the first frothing unit 11A and the second body of the second frothing unit 11B. In this example, the first body of the first frothing unit 11A comprises the left half of the first body 80 and the second body of the first frothing unit 11A comprises the left half of the second body 81.

In this example, the first body of the first frothing unit 11A comprises a first part of 82A of the first mixing unit 61A and first part 83A of the first frothing chamber 62A. Furthermore, the second body of the first frothing unit 11A comprises a second part 84A of the first mixing unit 61A and a second part 85A of the first frothing chamber 62A. Alternatively, a part of the first mixing unit 61A or of the first frothing chamber 62A can be implemented as a separate body part. However, the embodiment shown in FIG. 5B is especially advantageous, since both frothing units 11A, 11B can be implemented using only two body parts 80, 81 that can easily be separated by a user for cleaning. A reduced number of parts is especially beneficial since the user does not need to disassemble a plurality of parts for cleaning. A reduced number of parts and easy disassembly/reassembly facilitates the cleaning process. As can be seen from FIG. 5B, the free space 67A between mixing unit 61A and frothing chamber 62A is easily accessible for cleaning The first body 80 further comprises a first conical contact surface 86A and the second body 81 further comprises a second conical contact surface 87A. In this embodiment, the first body 80 comprises the first body of the first frothing unit 11A and the second body 81 comprises the second body of the first frothing unit 11A as explained above. Advantageously, at least one of the contact surfaces 86A and 87A comprises a material configured for providing a seal for sealing the first frothing chamber 62A in an assembled state. Further contact surfaces can be provided at the central elements that constitute steam splitter 30 and milk splitter 40 or generally at any other part of the device, where alignment and/or sealing is desired.

Figure 6A:
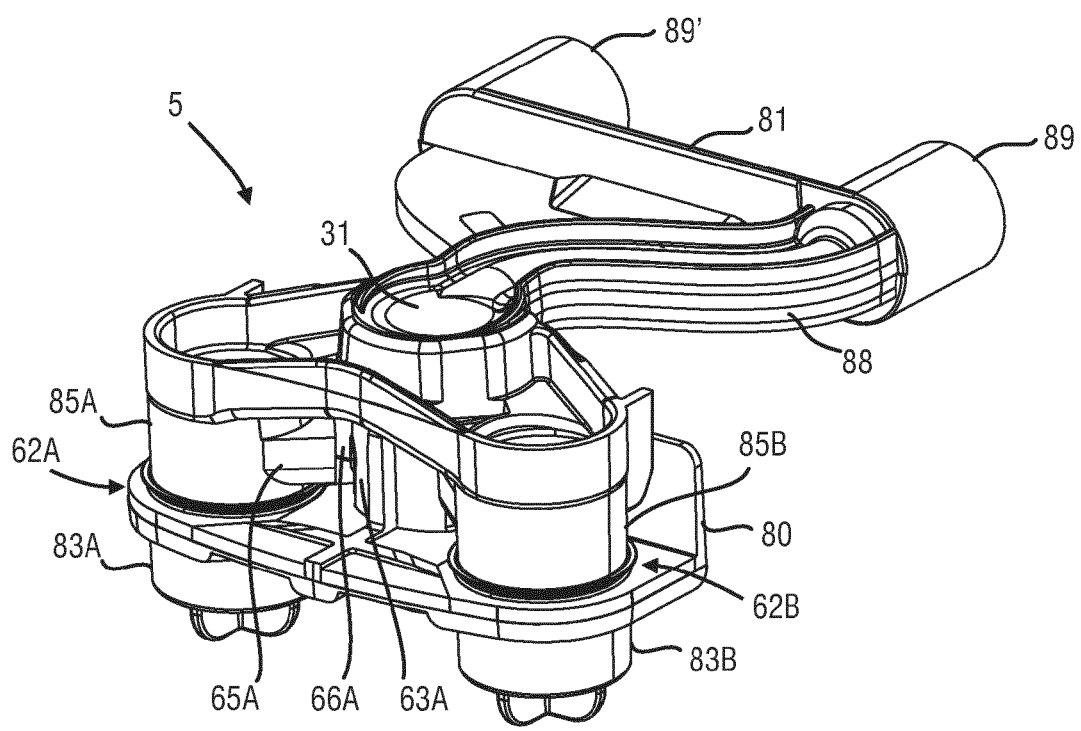
FIG. 6A shows an embodiment of a device for frothing a liquid.
Figure 6B:
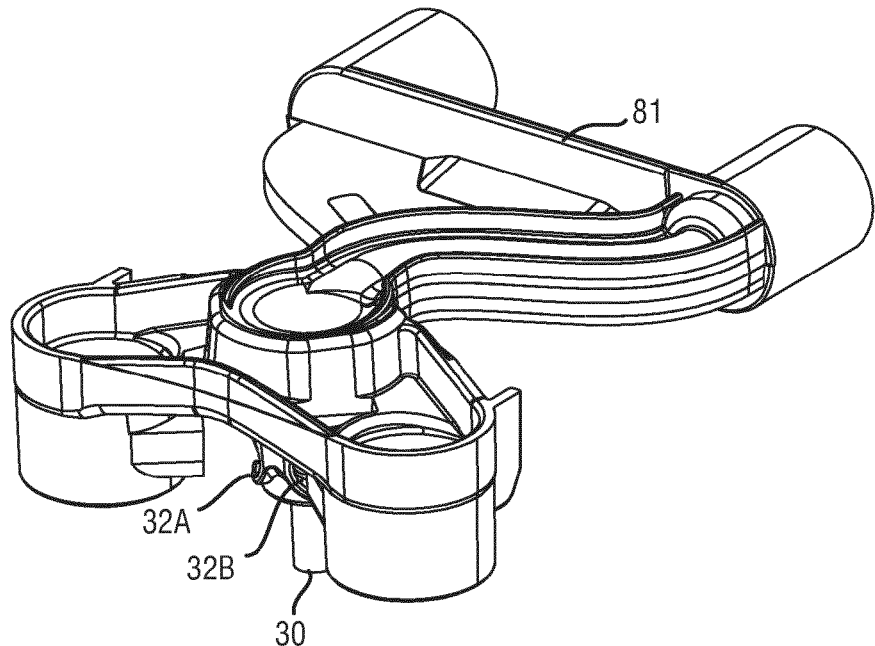
FIGS. 6B and 6C show a first body of the device for frothing a liquid of FIG. 6A.
Figure 6C:
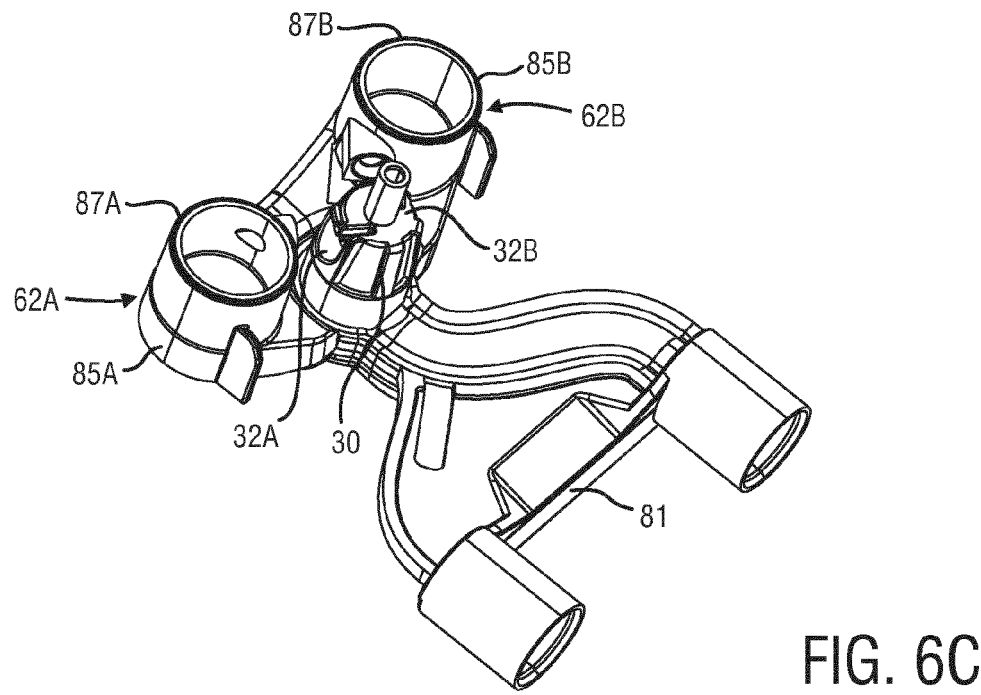
Figure 6D:
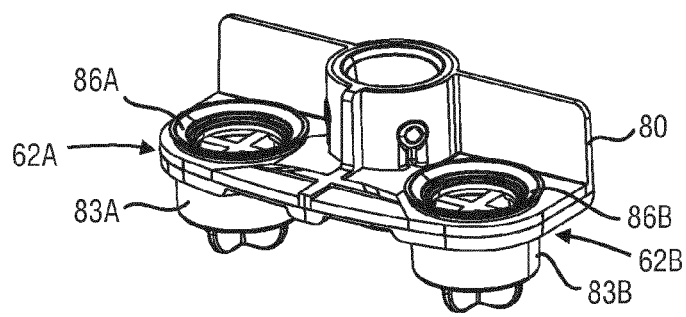
FIGS. 6D and 6E show a second body of the device for frothing a liquid of FIG. 6A.
Figure 6E:
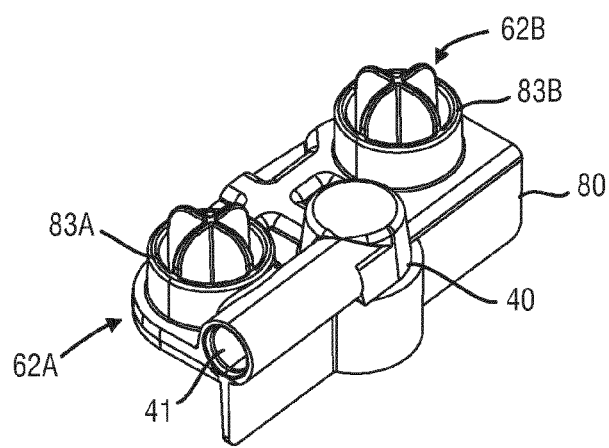

FIG. 6A shows a further embodiment of a device 5 for frothing a liquid according to a further aspect of the present invention. The device 5 comprises a first body 80 and a second body 81. The steam generator is known in the art and is not shown in this embodiment. FIG. 6B shows a top perspective view of the second body 81. FIG. 6C shows a bottom perspective view of the second body 81. FIG. 6D shows a top perspective view of the first body 80. FIG. 6E shows a bottom perspective view of the first body 80.

The second body 81, also referred to as top body 81 comprises a steam pipe 88 and a steam-pipe connector 89 for connection to a steam generator for generating a stream of steam. The steam pipe 88 is connected to the steam-splitter inlet 31.

The steam-pipe connector 89 is connected to a front side of, for example, a main body of a coffee machine. The second connector 89' in this embodiment serves for mechanical stability. Alternatively, the second connector 89' can be configured for receiving a liquid, for example coffee, for providing one or more streams of coffee along with a frothed liquid. Further alternatively, the second connector 89' is configured for receiving water and/or steam that is guided towards a part to be cleaned. For example, water is provided via the second connector 89' for rinsing the liquid splitter 40.

The first frothing unit and the second frothing unit are denoted by 62A and 62B. As previously shown in FIG. 5B, the first body 80 comprises a first part 83A of the first frothing chamber 62A and the second body 81 comprises a second part 85A of the first frothing chamber 62A. Furthermore, the first body 80 comprises a first part 83B of the second frothing chamber 62B and the second body 81 comprises a second part 85B of the second frothing chamber 62B. The first mixing-unit outlet 63A is separated from the first frothing-chamber inlet 65A by a free space 66A for providing a frothing gas.

FIG. 6B shows a top perspective view of the second part 81. The central element is the steam splitter 30 with the first steam outlet 32A and the second steam outlet 32B.

FIG. 6C shows a bottom perspective view of the second body 81 with the steam splitter 30 as the central element having the first steam outlet 32A and the second steam outlet 32B. The second part 85A of the first frothing chamber 62A and the second part 85B of the second frothing chamber 62B comprise conical contact surfaces 87A, 87B. The conical contact surfaces 87A, 87B of the first and second frothing chambers 62A, 62B correspond to the contact surfaces 86A, 86B of the first body 80 shown in FIG. 6D. Optionally, at least one of the contact surfaces 86A, 86B, 87A, 87B comprises a rubber or rubber-like material for sealing the frothing chamber when the first body 80 and the second body 81 are connected together as shown in FIG. 6A.

The first body 80, shown in a top perspective view in FIG. 6D further comprises the first part 83A of the first frothing chamber 62A and the first part 83B of the second frothing chamber 62B.

FIG. 6E shows a bottom perspective view of the first body 80. The first body 80 comprises a first part 83A of the first frothing chamber 62A and the first part 83B of the second frothing chamber 62B. The first body 80 further comprises a part of the liquid splitter 40 and the liquid splitter inlet 41 for receiving the liquid to be frothed.

Figure 7A:
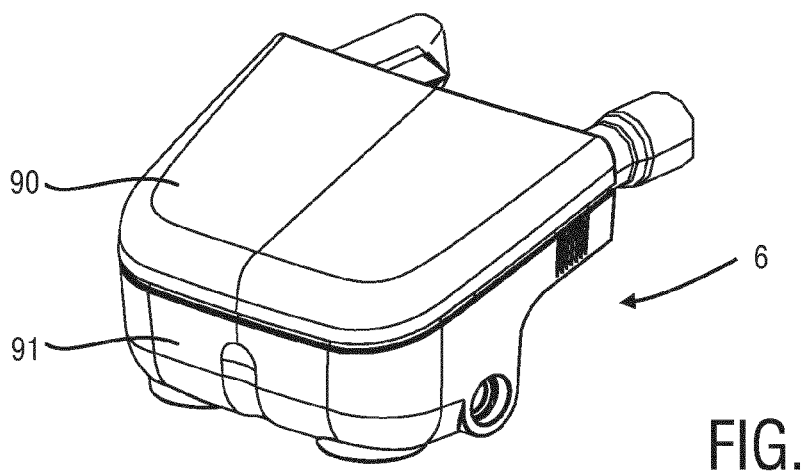
FIGS. 7A to 7F show a further embodiment of a device for frothing a liquid.
Figure 7B:
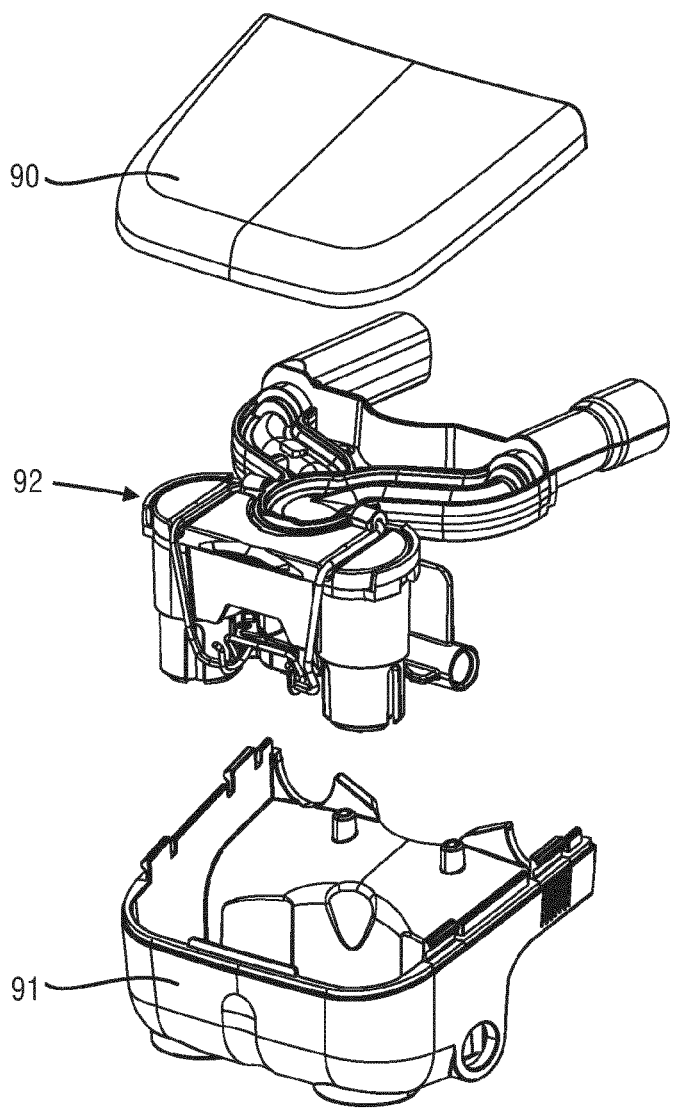

FIGS. 7A to 7F show a further embodiment of a device 6 for frothing a liquid according to an aspect of the present invention. FIG. 7A shows the device 6 in an assembled state, whereas FIG. 7B shows an exploded view. The device 6 comprises an upper housing part 90 and a lower housing part 91. The central part 92 is similar to the devices 4 and 5 of the embodiment shown in FIGS. 5 and 6.

Figure 7C:
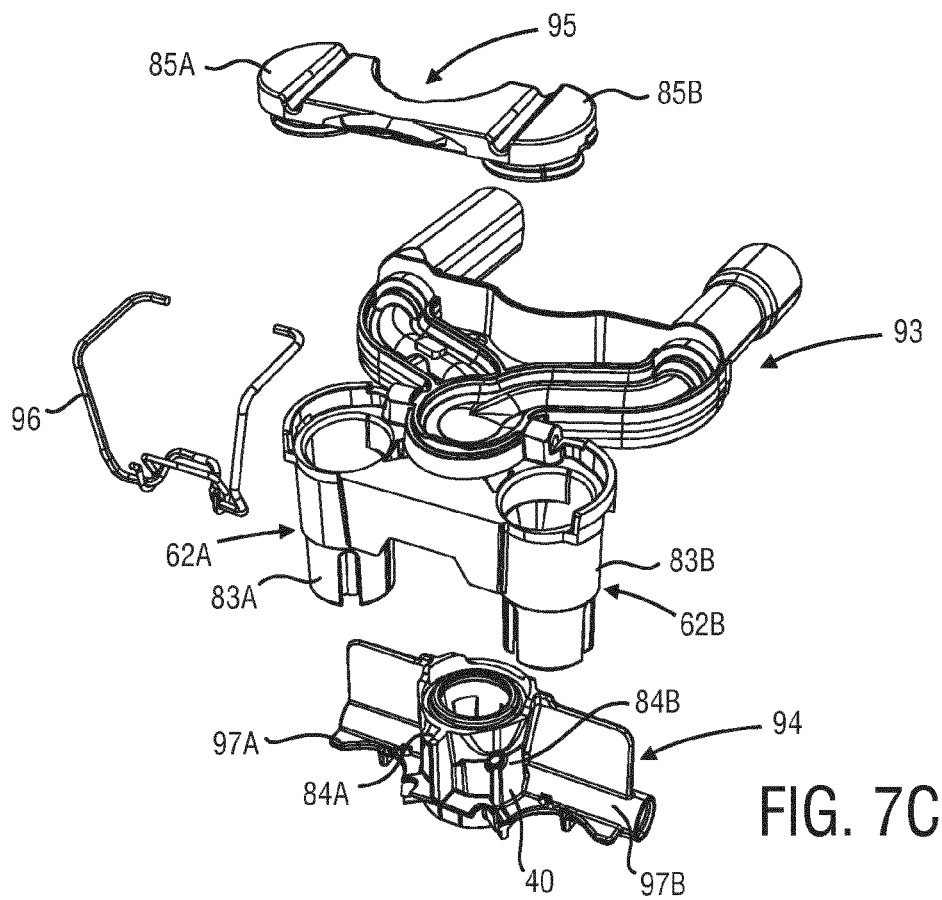
Figure 7D:
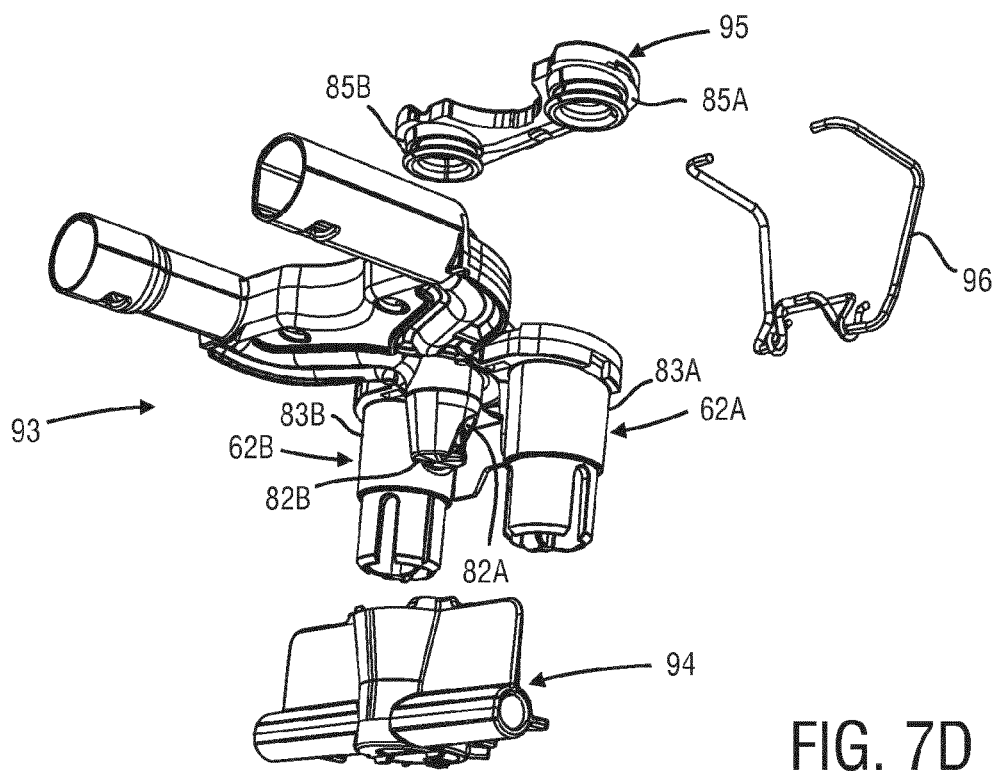

FIGS. 7C and 7D show a perspective exploded view of the central part 92. The central part 92 comprises a first common body 93, a second common body 94 and a third common body 95. In the following, elements 82,83,84 and 85 are referred to that have been previously shown in FIG. 5B. The first common body 93 comprises a first part 82A of the first mixing unit 61A, a first part 82B of the second mixing unit 61B, a first part 83A of the first frothing chamber 62A and a first part 83B of a second frothing chamber 62B. The second common body 94 comprises a second part 84A of the first mixing unit 61A and a second part 84B of the second mixing unit 61B. The third common body 95 comprises a second part 85A of the first frothing chamber 62A and a second part 85B of the second frothing chamber 62B. A mounting clip 96 is configured for releasibly holding the first common body 93, the second common body 94 and the third common body 95 together, as shown in FIG. 7B.

As shown in FIG. 7C, the second common body 94 further comprises a first liquid pipe 97A and a second liquid pipe 97B for providing a liquid to the liquid splitter 40 comprised in the second common body 94. A liquid supply can be selectively connected to the first liquid pipe 97A or the second liquid pipe 97B such that a liquid supply can be positioned at either side of the device. Alternatively, two different liquids can be supplied in parallel wherein a first liquid to be frothed via the first frothing chamber 62A is provided at liquid pipe 97A, and a second liquid to be frothed via the frothing chamber 62B is provided at the liquid pipe 97B.

Figure 7E:
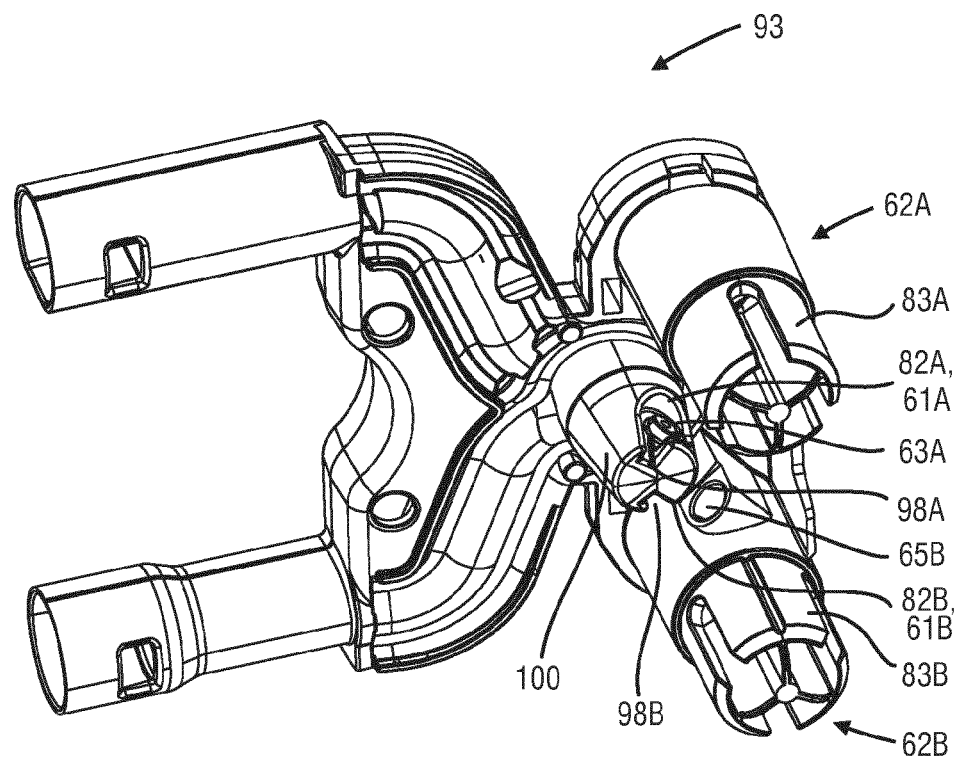

FIG. 7E shows a more detailed view of the first common body 93. The liquid supplied to the second common body 94 is provided to the first mixing unit 61A and the second mixing unit 61B via liquid channels 98A and 98B. It should be noted that the first common body 93 comprises the first part 82A of the first mixing unit 61A and the first part 82B of the second mixing unit 61B. When connected, the first common body 93 and the second common body 94 thereby act as a liquid splitter 40. Also the first steam-splitter outlet 32A as well as the second frothing-chamber inlet 65B are shown.

Figure 7F:
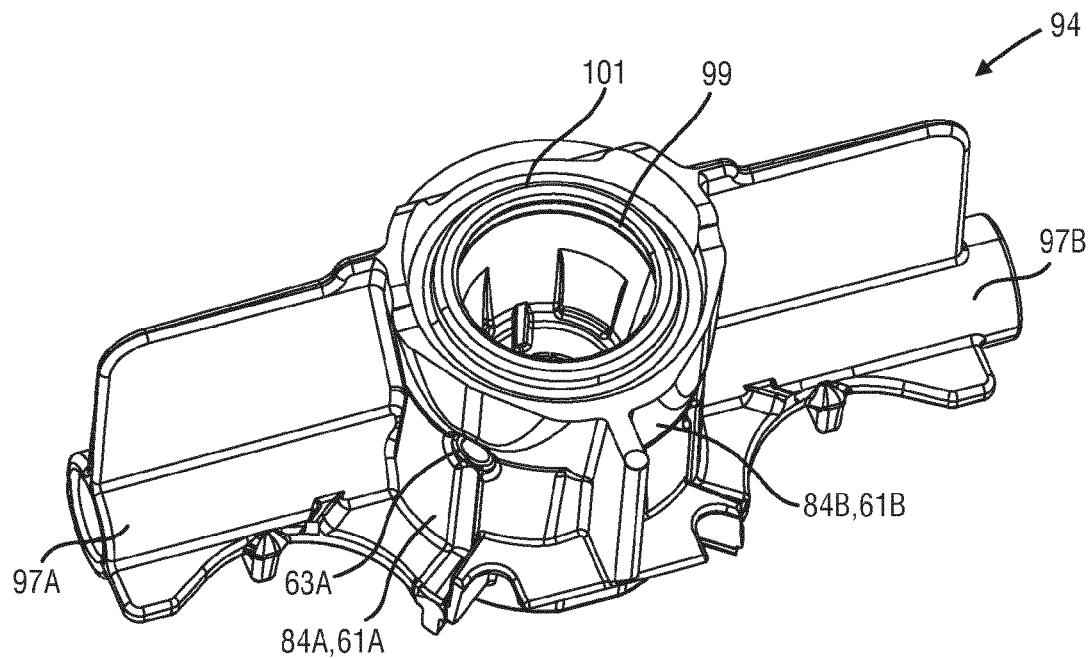

FIG. 7F shows a more detailed perspective view of the second common body 94. The first liquid pipe 97A is shown to the left side, the second liquid pipe 97B at the right side. The central part 99 comprises a substantially conical shape for receiving the central conical shape 100 of the first common body 93. It should be noted that the second common body 94 comprises the second part 84A of the first mixing unit 61A and the second part 84B of the second mixing unit 61B. In this embodiment, first mixing-unit outlet 63A constitutes a part of the second part 84A of the first mixing unit 61A. The operating principle has been described with reference to FIGS. 4 and 5.

The second common body 94 further comprises a sealing structure 101 in particular comprising a conical surface for providing a tight seal when the second common body 94 is connected to the first common body 93.

An advantage of this embodiment, in particular of the first common body 93, is that the frothing chambers 62A, 62B can be easily accessed by removing the third common body 95. Thereby, the frothing chambers can be easily cleaned by flushing and rinsing them from top to bottom. Furthermore, the frothing-gas inlet can be accessed and easily cleaned by removing the second common body 94.

Figure 8A:
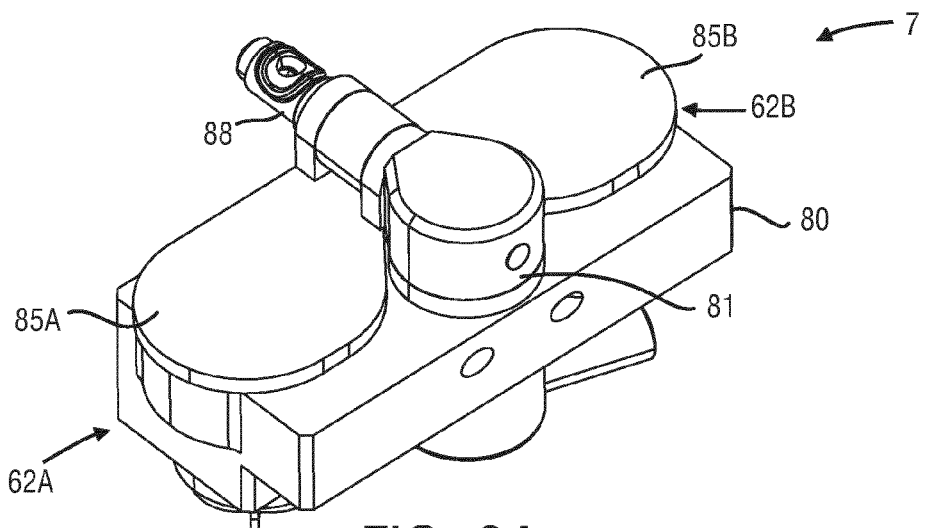
FIGS. 8A to 8B show a further embodiment of a device for frothing a liquid.
Figure 8B:
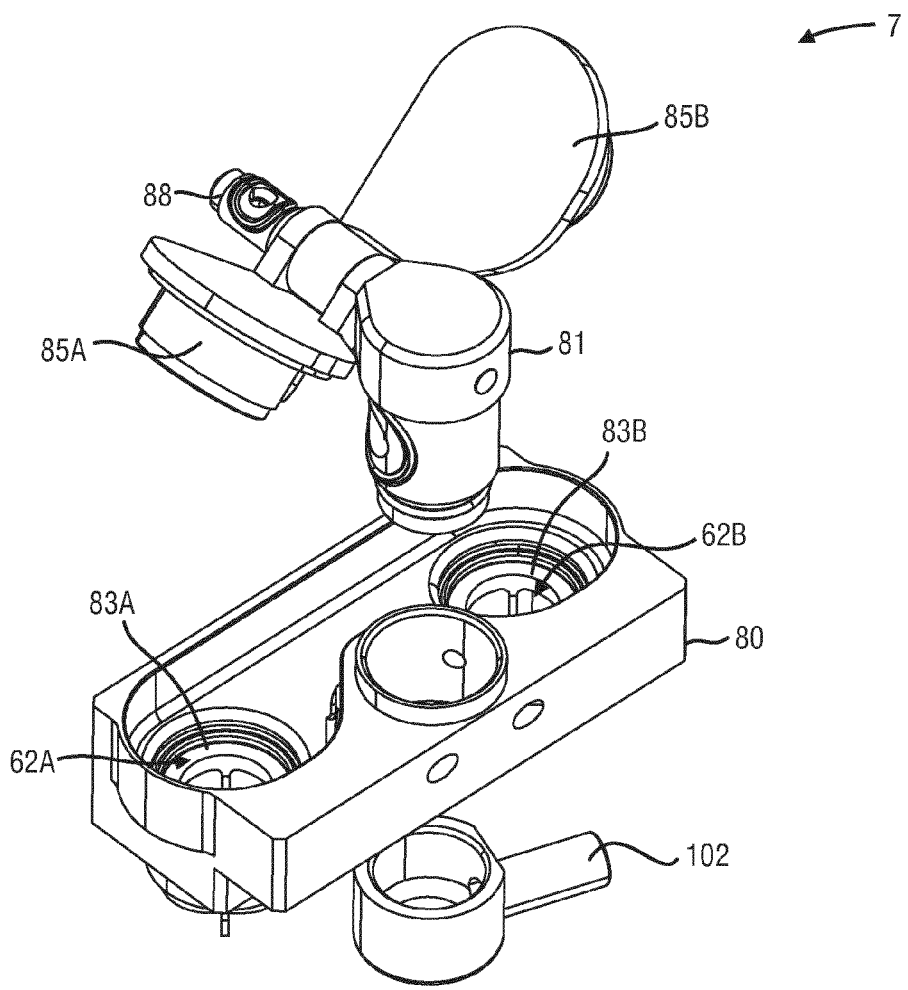

FIGS. 8A and 8B show a modification to the embodiments shown in FIGS. 5 and 6. In this embodiment, the first frothing chamber 62A and the second frothing chamber 62B comprise movable second parts 85A, 85B. The movable parts 85A, 85B in this embodiment can rotate with respect to the steam pipe 88. Furthermore, this embodiment comprises a rotatable liquid connector 102 for receiving a liquid from different directions.

FIGS. 9A to 9F show a further embodiment of the device 8 for frothing a liquid according to an aspect of the present invention. The device 8 comprises a first body 80, a second body 81 and a rotatable liquid connector 102.

Figure 9E:
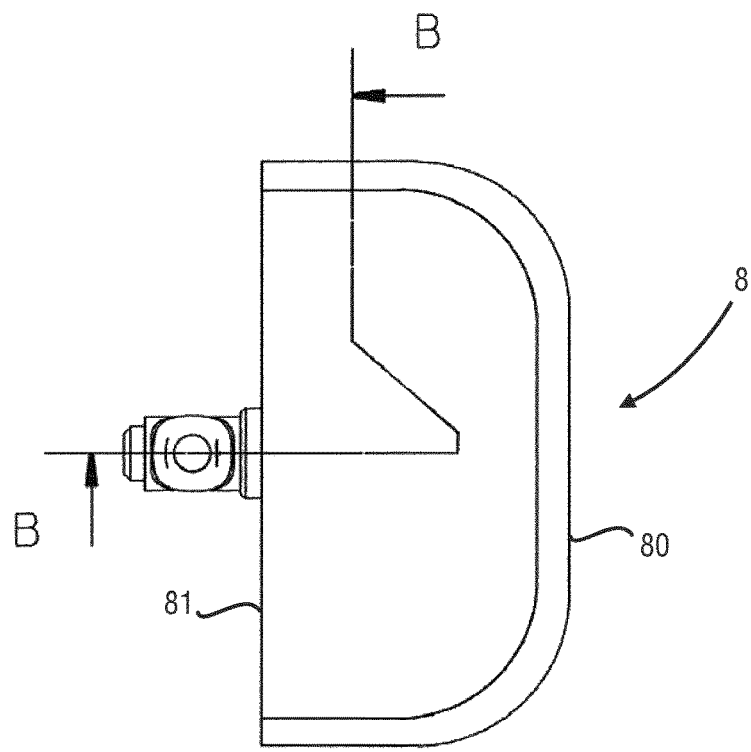
Figure 9F:
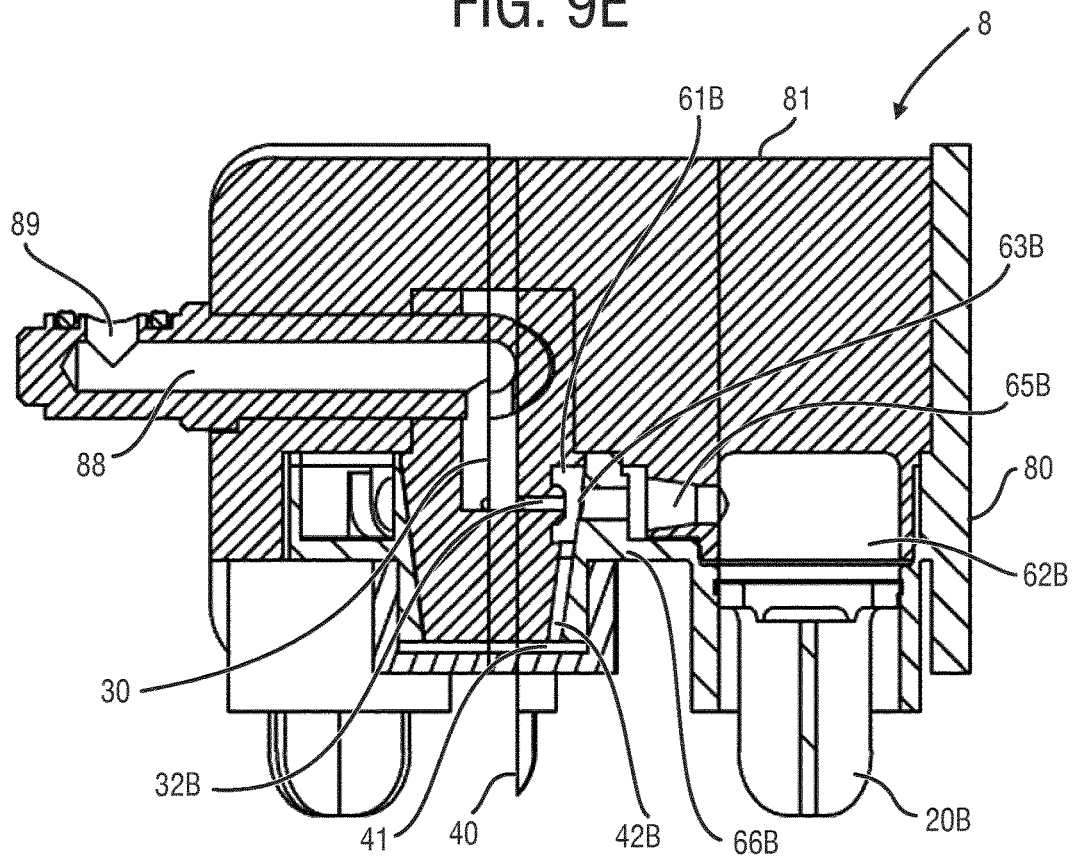

FIG. 9F shows a sectional view along line B-B of FIG. 9E. The steam generator (not shown) is connected to a steam connector 89 for providing a stream of steam via a steam pipe 88. The steam pipe 88 is connected to the steam splitter 30. A sub-stream of steam is provided at the second steam outlet 32B of the steam splitter 30. The device 8 further comprises a liquid splitter 40 having a liquid-splitter inlet 41 and a second liquid outlet 42B. The second steam outlet 32B and the second liquid outlet 42B are connected to the second mixing unit 61B for providing a combination of liquid and steam at a second mixing-unit outlet 63B. The second mixing unit outlet 63B is separated from the second frothing-chamber inlet 65B by a free space 66B containing a frothing gas. The second frothing chamber 62B comprises a second frothing-chamber inlet 65B for receiving the combination of liquid and steam from the second mixing unit 61B. Thereby, froth can be provided at a second frothing-unit outlet 20B. An advantage of this embodiment is that there are only two rigid bodies and a steam connection. It is easy to assemble, has no loose parts, and offers easy cleaning In conclusion, several embodiments of a new type of device for frothing a liquid have been presented that offer a compact design, improved cleanability and can provide equal amounts of froth at the froth outlets.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A device for frothing a liquid, comprising:
a steam generator for generating a stream of steam;

a steam splitter for splitting the stream of steam into a first sub-stream of steam and a second sub-stream of steam, wherein the first sub-stream of steam is provided at a first steam outlet and the second sub-stream of steam is provided at a second steam outlet;

a first frothing unit having (i) a first mixing unit, which is connected to a first liquid inlet and a first steam inlet for providing a combination of liquid and steam, and (ii) a first frothing chamber for receiving and frothing the combination of liquid and steam from the first mixing unit;

a second frothing unit having (i) a second mixing unit, which is connected to a second liquid inlet and a second steam inlet for providing a combination of liquid and steam, and (ii) a second frothing chamber for receiving and frothing the combination of liquid and steam from the second mixing unit;

wherein the first steam outlet of the steam splitter is connected to the first steam inlet of the first frothing unit and the second steam outlet of the steam splitter is connected to the second steam inlet of the second frothing unit;

wherein the first frothing unit and the second frothing unit comprise at least one of:

a common first body comprising a first part of the first mixing unit, a first part of the second mixing unit, a first part of the first frothing chamber and a first part of the second frothing chamber; and a common second body comprising: (i) at least one of a second part of the first mixing unit and a second part of the first frothing chamber, and (ii) at least one of a second part of the second mixing unit and a second part of the second frothing chamber.

2. The device for frothing a liquid according to claim 1, further comprising;

a liquid splitter for splitting the liquid into a first sub-stream of liquid and a second sub-stream of liquid, wherein the first sub-stream of liquid is provided at a first liquid outlet and the second sub-stream of liquid is provided at a second liquid outlet, and wherein the first liquid outlet of the liquid splitter is connected to the first liquid inlet of the first frothing unit and the second liquid outlet of the liquid splitter is connected to the second liquid inlet of the second frothing unit.

3. The device for frothing a liquid according to claim 1, further comprising;

one of a steam-splitter control for manipulating the splitting of the stream of steam into the first and the second sub-stream of steam and a liquid-splitter control for manipulating the splitting of the liquid into the first and the second sub-stream of liquid.

4. The device for frothing a liquid according to claim 3, wherein the steam-splitter control manipulates a cross-section of at least one of the first stream outlet and the second steam outlet of the steam splitter.

5. The device for frothing a liquid according to claim 3, wherein the liquid-splitter control manipulates a cross-section of at least one of the first and the second liquid outlet of the liquid splitter.

6. The device for frothing a liquid according to claim 1, wherein the first frothing unit further comprises a first frothing-gas inlet.

7. The device for frothing a liquid according to claim 6, wherein the first mixing unit comprises a first mixing-unit outlet for providing the combination of liquid and steam;

wherein the first frothing chamber comprises a first frothing-chamber inlet for receiving the combination of liquid and steam from the first mixing unit;

wherein the first mixing-unit outlet is separated from the first frothing-chamber inlet by a free space; and wherein said free space constitutes the frothing-gas inlet.

8. The device for frothing a liquid according to claim 7, wherein the first body of the first frothing unit and the second body of the first frothing unit are configured for separation in a direction transverse to an axis extending through the first mixing-unit outlet and the first frothing-chamber inlet.

9. The device for frothing a liquid according to claim 1, wherein the common first body comprises a first conical contact surface; and wherein the common second body comprises a second corresponding contact surface.

10. The device for frothing a liquid according to claim 1, further comprising alignment means for aligning the common first body and the common second body with respect to each other.

11. The device for frothing a liquid according to claim 1, wherein at least one of the common first body and the common second body comprises at least one of rubber and 2K mold.

12. A coffee machine comprising: a coffee brewing unit for providing a stream of coffee, and the device for frothing a liquid according to claim 1.

* * * * *